3,716,411
Patented Feb. 13, 1973

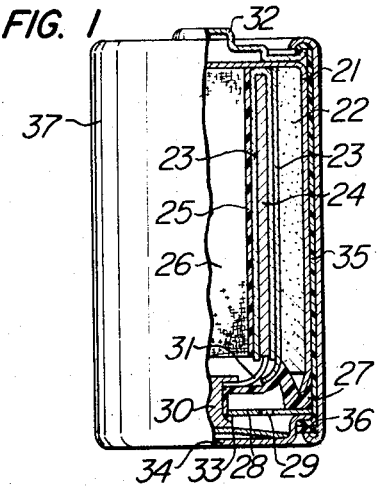
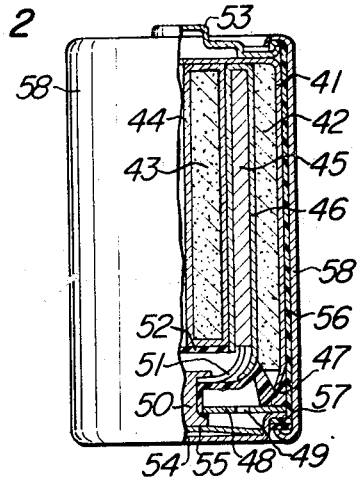
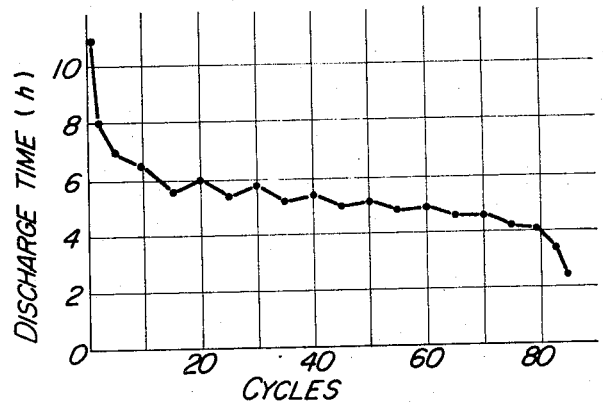
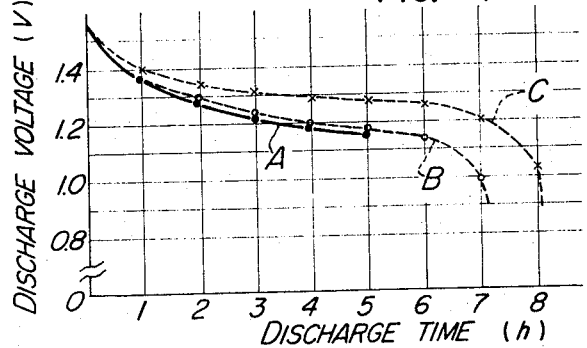

3,716,411
RECHARGEABLE ALKALINE MANGANESE CELL
Hiromichi Ogawa, Moriguchi, Tsukasa Ohira, Nara, Kaoru Murakami, Hirakata, and Takao Yokoyama, Neyagawa, Japan, assignors to Matsushita Electric Industrial Co., Ltd., Osaka, Japan
Filed Jan. 29, 1971, Ser. No. 111,069
Claims priority, application Japan, Feb. 2, 1970, 45/9,111
Int. Cl. H01m 43/02
U.S. Cl. 136—30     3 Claims

ABSTRACT OF THE DISCLOSURE

A rechargeable alkaline manganese cell wherein manganese dioxide is used as a positive electrode active material, zinc is used as a negative electrode active material and alkaline aqueous solution mainly composed of potassium hydroxide is used as an electrolyte and the discharge capacity of the negative electrode is controlled within such a range that the positive electrode can be reversed to non-discharge state by charging after discharging and said positive and negative electrodes face in their opposite sides through a mat-like separator of a given thickness therebetween.

---

This invention concerns a rechargeable alkaline manganese cell wherein manganene dioxide is used as a positive electrode active material, zinc is used as a negative electrode active material and an alkaline aqeous solution mainly composed of potassium hydroxide is used as an electrolyte and more particularly it relates to a cell which requires no supervision and control of the end of discharging and charging and which can be simply handled by controlling the capacity of zinc negative electrode within a range in which manganese dioxide positive electrode can be reversed to non-dicharge state by charging after discharging and by providing a mat-like separator of a given thickness in contact with the manganese dioxide positive electrode and providing the zinc negative electrode of a given thickness facing with opposite side of positive electrode through said separator.

This invention provides an improvement of the invention mentioned in U.S. Pat. 3,530,496.

A rechargeable alkaline manganese cell has been accomplished by finding the conditions for using as a secondary battery in attempts on handling of an alkaline manganese cell as a primary battery. An alkaline manganese cell has been originally developed as a primary battery and is designed in such a manner that cost per unit energy (w./h.) is relatively low. The rechargeable alkaline manganese cell is an alkaline manganese cell developed as a primary battery which may be repeatedly used by recharging like a secondary battery and hence is considerably cheap among rechargeable cells. However, it has been known that a manganese dioxide positive electrode, different from that of the general storage batteries, cannot be reversed to non-discharge state even by immediate charging after deep discharge.

That is, when discharge is carried out until 0.9 v. under load of 4Ω resistance with standard of an alkaline manganese cell of D size and C size, the capacity of the positive electrode is nearly non-reversible to non-discharge state even when sufficient charging is carried out immediately after discharging. Subsequent discharge efficiency is extremely deteriorated and the cell cannot be used. According to the inventors' research, it has been confirmed that in a positive electrode formed by molding a mixture of highly active manganese dioxide ($\gamma$-$MnO_2$) powders which are electrolytically produced and graphite powders, in case of discharge within about 40% of theoretical capacity, premising the reaction of from manganese dioxide ($MnO_2$) to monoxy manganese hydroxide (MnOOH) calculated from available amount of oxygen (value $x$ in $MnO_x$) of manganese dioxide active material, the subsequent charging causes reversion of the available oxygen amount to nearly non-discharge state, although this somewhat varies depending upon discharge current density, temperature, etc.

However, in general, an alkaline manganese cell is constructed in such a manner that the capacity of zinc negative electrode is nearly the same as or slightly smaller than that of manganese dioxide positive electrode to prevent the generation of hydrogen gas within the cell at over-discharge. Therefore, if discharge of a cell is continued to reach a voltage which can be used, e.g., 0.9 v.~0.75 v., the manganese dioxide positive electrode is discharged by about 100% of its theoretical capacity. Such deep discharge cannot result in reversion to non-discharge state by charging as mentioned above.

Therefore, it has been required to discontinue the discharging at a certain level by hand or automatic discharge supervisory means such as coulometer, timer, discharge voltage supervisory device, etc.

The rechargeable alkaline manganese cell has a sealed construction similar to that of alkaline manganese cell which is a primary battery. Therefore, in order to prevent generation of a gas within the cell container at overcharge and furthermore to avoid internal short phenomenon which cannot be overcome and which is caused by penetration of dendritic deposit metallic zinc which grows from zinc negative electrode into a separator between the positive and negative electrodes, the constant voltage charge method or constant voltage cut-off charge method in which a charging circuit is formed to control the voltage below 1.7~1.8 v. per unit cell even at the end of charging has been often employed to accomplish charging after discharging. Furthermore, in order to prevent internal short caused by dendritic deposit zinc, a dense semipermeable membrane such as cellophane is sometimes used as a separator. In this case, the internal short phenomenon can be prevented, but the internal pressure of a cell is apt to increase due to overcharging. Therefore, it has been required to employ said constant voltage charging method or constant voltage cut-off charging method. When such method is not employed, it was necessary to artificially discontinue the charging when a charge capacity (usually about 100–120% of the discharge capacity) corresponding to a discharge capacity was attained.

As is clear from the above explanation, a rechargeable alkaline manganese cell itself is relatively cheap, but handling thereof at charging and discharging is complicated or it requires considerably expensive accessories or circuits for supervision or control of end of charging and discharging. Thus, the rechargeable alkaline manganese cell has not been widely used. Especially, said constant voltage charging or constant voltage cut-off charging which are considered essential has the following disadvantages.

That is, when charge-discharge cycle wherein a discharge of about 20–40% of the theoretical capacity of manganese dioxide positive electrode is carried out is continued with conventional rechargeable alkaline manganese cell, the final discharge voltage gradually decreases as shown in FIG. 4 and at about 30 cycles, reaches 0.9 v. which is a final discharge voltage specified as primary battery. At subsequent cycles, decrease of the final discharge voltage becomes spontaneous.

As the results of studying such deterioration phenomenon caused by cycles of the conventional rechargeable alkaline manganese cell, the following have been found.

When each cycle of a discharge of about 20–40% of the theoretical capacity of positive electrode is repeated, available oxygen amount of manganese dioxide positive electrode after charging is apt to become lower, although this is extremely slow. This fact means that lower oxides of manganese such as $Mn_3O_4$ and $MnOOH$ which have higher specific resistance than manganese dioxide gradually increase. Therefore, with progress of charge-discharge cycle, internal resistance of positive electrode gradually increases and shortage of charging is caused due to constant voltage charging. This is considered to be a main cause for the gradual decrease of the final discharge voltage until about 30 cycles. However, the increase of the internal resistance of a cell with progress of charge-discharge cycle is not merely due to the positive electrode. That is, regardless of whether in the form of gel or a mold electrode, the porosity of a zinc negative electrode is increased so that the contact area with an electrolyte is increased and polarization at discharge is reduced. Such zinc negative electrode of high porosity is excellent for a primary battery, but has many problems as a negative electrode for a rechargeable cell as it is.

One of the problems is that in order to keep a zinc negative electrode at high porosity, in many instances, hydrophilic high molecular materials such as sodium salt of carboxymethyl cellulose (Na-CMC), etc. have conventionally been incorporated into the zinc electrode, but it is dissolved in the electrolyte to increase the viscosity of the electrolyte.

Furthermore, at discharge, the resolution reaction of zinc active material causes no troubles due to great surface area of the negative electrode unless continuous discharge is effected at an extremely high current. Rather, since the electrolyte has a high viscosity, zincate ions produced are apt to partially become super-saturated, whereby separation of zinc oxide which is a discharge final product is accelerated and regeneration of hydroxyl ion which is required for discharge is promoted. However, the velocity of reaction by which zinc of the negative electrode is electrochemically produced with reduction at charging of a rechargeable cell is controlled by diffusion of zincate ions.

When the dissolved zincate ions in the electrolyte is reduced to zinc and zincate ion concentration in which electrolyte becomes lower, the zinc oxide which is a discharge final product is again dissolved in the electrolyte to produce zincate ion. It the electrolyte is viscous, the dissolving rate of zinc oxide is slow and the zinc negative electrode is polarized before complete reduction of discharge product and as the result, the potential becomes negative towards that at which hydrogen is generated. In the constant voltage charging method for a given period, the shortage of charging is increased with progress of cycles due to increase of the internal resistance of the positive electrode and polarization of the negative electrode. Finally, the capacity of the zinc negative electrode is decreased and the end of discharge is limited by the capacity of the negative electrode. It is due to deterioration of the capacity of the zinc negative electrode that when charge-discharge cycle is repeated, the final discharge voltage is extremely decreased.

Observation of the zinc negative electrode of a cell in such state shows that the part near a current collector thereof is in metallic state, but white zinc oxide layer is formed at the parts apart from the current collector. As mentioned above, the conventional rechargeable alkaline manganese cell has used a highly porous zinc negative electrode which is the same as that for the primary battery. Due to this fact, utilization efficiency of zinc active material at charging and discharging is low and said viscous electrolyte causes increase of polarization during charging and thick active material layer results in insufficient network of electric conductivity within the zinc negative electrode.

Furthermore, the rechargeable alkaline manganese cell is not necessarily used as a unit cell and in some cases, used in a series of several cells. In such case, considering the heterogeneousness of each cell which have been conventionally constructed, the given voltage of the constant voltage charging device has often been adjusted at a lower level. In this case, said shortage of charging is promoted and deterioration of the capacity of the cells becomes conspicuous due to repeated charge-discharge cycle.

One object of this invention is to control the capacity of a zinc negative electrode within a range wherein a manganese dioxide positive electrode can be reversed by charging after discharging.

Another object of this invention is to improve charging and discharging characteristics with use of a thickness of the zinc negative electrode and a mat-like separator of a given thickness.

Further object of this invention is to provide a cheap alkaline manganese cell capable of being easily handled and industrially manufactured.

FIG. 1 is a partly cross-sectional side view of a rechargeable alkaline manganese cell according to one embodiment of this invention.

FIG. 2 is a partly cross-sectional side view of a rechargeable alkaline manganese cell according to another embodiment of this invention.

FIG. 3 shows the charge-discharge cycle characteristic of the cell shown in FIG. 1.

FIG. 4 shows the discharge characteristics of the cells shown in FIGS. 1 and 2 and a prior art cell.

FIG. 1 shows a rechargeable alkaline manganese cell according to one embodiment of this invention. In FIG. 1, 21 is an electrode can made of a nickel plated steel sheet, 22 is a positive electrode of a molded mixture of manganese dioxide powders and graphite powders, 23 is a separator comprising a mat-like sheet produced from alkali resistant purified cotton fibers treated with caustic alkali to dissolve out soluble matter, by the paper making process with use of polyvinyl alcohol as a binder. Inside of said separator, negative electrode 24 is provided surrounded in U-form by a part of the separator 23. Said negative electrode is formed by applying to a copper net a paste obtained by kneading amalgamated zinc powders and short fibers of the purified cotton together with an aqueous solution of polyvinyl alcohol and drying thus treated copper net. The initial discharge capacity of the negative electrode 24 is adjusted so that it does not exceed 60% of theoretical capacity of positive electrode 22. Inside of negative electrode 24, there is provided electrolyte impregnating material 26 which comprises a mat of alkali resistant cotton fibers supported by perforated cylindrical support 25 made of a synthetic resin such as polyvinyl chloride. Said cylindrical support 25 is also effective for regulating the compactness of the separator which prevents falling off of the active material of the zinc negative electrode 24 during charging and discharging. Electrolyte is impregnated in positive electrode 22, separator 23, negative electrode 24 and electrolyte impregnating material 26. 27 is a seal made of polyethylene, 28 is an inner metal bottom plate in which hole 29 is drilled as a gas vent, 30 is a conductor which penetrates the center of seal 27 and rivets lead tab 31 of negative electrode 24, 32 is an upper plate which also serves as a positive electrode terminal plate, 33 is an outer metal bottom plate which also serves as a negative electrode terminal plate, and 34 is a spring. These are integrated through polyvinyl chloride tube 35. 36 is a ring-like insulating packing and 37 is a cylindrical metal jacket, the upper and lower end of which are curled toward inside to seal the cell.

The rechargeable alkaline manganese cell as shown in FIG. 1 was subjected to charge-discharge cycle test which comprises repeating the discharge to less than 0.75 v. under load of 4Ω resistance and the charge at a constant current of 150 ma. for 16 hours. A charging time of 72 hours was employed at every 10th cycle and anti-overcharge characteristic was also examined. The results are shown in FIG. 3. In FIG. 3, the ordinate shows discharge time for which the voltage reaches 0.9 v. and the abscissa shows number of cycles. As is clear from FIG. 3, the cell according to this invention, even when apparently deep discharge was repeated at every cycle, was not markedly deteriorated in its discharge characteristic as the conventional cell and showed a cycle life of nearly 80 cycles. Furthermore, no troubles were caused by overcharge. It was confirmed that during the charge-discharge cycle test, the stoppage of discharge of each cycle was limited by capacity of the negative electrode.

First, regarding discharge, as mentioned before, the initial discharge capacity of the negative electrode of the rechargeable alkaline manganese cell of this invention is prepared so that it does not exceed 60% of the theoretical capacity of the positive electrode. This seems to be inconsistent with the fact that the manganese dioxide positive electrode cannot be reversed to non-discharge state by charging unless the depth of discharge is about 20–40% of the theoretical capacity of the positive electrode at every cycle as mentioned before. However, according to the examination on an actual cell, in case of such depth of discharge of the zinc negative electrode which does not exceed 60% of the theoretical capacity of manganese dioxide positive electrode at initial discharge, no effect is given on the subsequent charge-discharge cycles. This is due to the fact that as shown in FIG. 3, the capacity of the zinc negative electrode is abruptly reduced to and stabilized at about 20% of the theoretical capacity of the manganese dioxide positive electrode within 5–10 cycles. The initial charge capacity to the operation time-discharge capacity at initial discharging corresponds to about 50%. Therefore, the discharge time after 2 cycles is naturally reduced abruptly as compared with that of the initial discharge, but the discharge time is not markedly shortened with progress of charge-discharge cycle. Especially, it should be noted that as is clear from FIG. 3, the discharge time after anti-overcharge test effected every 10 cycles is not extremely increased.

The charge reaction proceeds at a sufficiently high efficiency until about 95–100% of the capacity at discharge before charging, but further continuation of charging causes reduction of zincate ion concentration in electrolyte and growth of dendritic deposit zinc from the surface of negative electrode, which finally penetrate the mat-like separator to form partial shortcircuit part with the manganese dioxide positive electrode. After this partial short phenomenon has occured, most of the charging current passes between positive and negative electrodes through said shortcircuit part and does not take part in an electrochemical reaction. Therefore, electrolysis of water in electrolyte in overcharging area does not take place and also does not contribute to coarsening of the dendritic zinc. Due to this fact, the voltage at the end of charging seldom exceeds 1.9 v. Thus, the internal pressure of the cell never increases and no such troubles as swelling and blowing out are caused.

According to confirmation by another test, continuous charging for more than one month caused no specific troubles and the charging voltage was only 1.75–1.85 v. The conventional rechargeable alkaline manganese cell which has not yet been operated or which has been charged and discharged within several cycles could, in some cases, stand overcharging for a long period with the same constant current as in the cell of this invention, but with progress of the charge-discharge cycle, no internal short phenomenon by dendritic deposit zinc takes place even when overcharging is caused and gas is generated within the cell. Especially, because of generation of oxygen gas from inside wall of the positive electrode can, the positive electrode is separated from the can, which causes conspicuous increase of internal resistance, or troubles such as inflation and puncture of cell container. This is considered due to the fact that as mentioned before, with progress of charge-discharge cycle, a thick layer of zinc oxide which is a discharge product is formed between the positive electrode and separator and current collector of the negative electrode and it obstructs the growth of dendritic deposit zinc from the center of the negative electrode.

In the cell of this invention, sufficient attention should be paid on the separator between the positive and negative electrodes. A suitable separator in this invention has the following requirements. (1) It is in the form of a mat such as a non-woven fabric. (2) The fibers which constitute the mat form have alkali-resistance and hydrophilic property such as purified cotton which is treated with caustic alkali to dissolve out the soluble matter and polyvinyl alcohol. (3) A binder is not necessarily required for forming the mat. However, use of a binder which is hydrophilic as the fibers themselves such as polyvinyl alcohol to control the change of fiber density per unit area or unit volume makes it easier to handle the separator during assembling of cell. (4) It has a high liquid absorbing property which has a great connection with improvement of charge and discharge efficiencies of the zinc negative electrode. And (5) it has a thickness of 0.5–4.0 mm. at the swelling state after impregnation with electrolyte. The requirement (5) is most important and this should be met even if the separator satisfies the requirements (1)–(4). That is, when less than 0.5 mm., short phenomenon is easily caused upon formation of dendritic deposit zinc from the zinc negative electrode during overcharging to prevent generation of gas within the cell. However, said short is apt to be non-reversible and the service life of the rechargeable cell becomes extremely short. On the other hand, when a separator having a thickness of more than 0.5 mm. is employed, no troubles are caused at overcharging as mentioned before and furthermore, the cell can keep a cycle life of at least several ten cycles which is substantially satisfactory.

However, when the thickness of the separator exceeds 4.0 mm., partial short phenomenon within the cell at overcharging occurs with difficulty and generation of gas within the cell cannot be prevented. As the results, inflation or puncture of the cell container is caused or the positive electrode is separated from the inside wall of the positive electrode can to cause troubles such as remarkable increase of the internal resistance of the cell. Thus, cycle life is shortened. According to the inventors' experiments, a separator having a thickness of 1.5–2.0 mm. has resulted in the most stable characteristics.

Thin thickness of the separator after swelling causes rapid accumulation of deposited zinc and shortening of the service life. On the other hand, when the thickness after swelling is great, gas is easily generated before short phenomenon takes place due to the positive and negative electrodes by dendritic deposit zinc and furthermore manganese dioxide of the positive electrode is often collapsed. Thus, it renders the handling of the cell dangerous.

When a separator having a thickness of 0.5–4.0 mm. as mentioned above is used, said problems can be overcome. The thickness is not so greatly dependent upon the shape of cells.

Another important point in the cell of this invention is the thickness of active material layer of the zinc negative electrode. As in the cell of one embodiment of this invention shown in FIG. 1, the thickness of the active material layer of zinc negative electrode mainly composed of amalgamated zinc kneaded and applied to copper net should be less than 3 mm. The conventional rechargeable alkaline manganese cell could not provide the effects similar to those of this invention, although it used a mat-like separator. The main reason therefor resides in the thickness of the separator. That is, as mentioned before, in the conventional rechargeable alkaline manganese cells, at a relatively early number of cycles, a zinc oxide layer is formed near the separator provided in contact with the positive electrode, namely, at the outer circumference of the zinc negative electrode due to repetition of charging and discharging. Thus, the growth of dendritic deposit zinc separated from the center portion of the zinc negative electrode at over-charging is prevented and hence internal short-circuit cannot take place. The reasons for such defects reside in that due to insufficiency of electric conductivity of the zinc negative electrode, zinc oxide which is a reaction product at discharging cannot be sufficiently reduced to conductive metallic zinc by charging. Such defects as seen in the conventional cells are not caused by limiting the thickness of the active material layer to not more than 3 mm. as in this invention. Furthermore, the fact that the thin thickness of the active material layer of the zinc negative electrode is employed as mentioned above has also a deep corelation with the fact that the charge-discharge cycle characteristic of a rechargeable alkaline manganese cell can be improved by limiting the capacity of the zinc negative electrode at initial discharge below 60% of the theoretical capacity of the positive electrode.

Further important point in this invention is the charging current. That is, as mentioned before, the rechargeable alkaline manganese cell of this invention requires no charging device with constant voltage or constant voltage cut-off circuit. Cheap and common constant current charging device may be applied. However, in case of the usual standard charging, a charging current density of the following range should be employed. That is, suitable range of the charging current density is about 2–12 ma./cm.$^2$ per the apparent surface area of the negative electrode which oppositely faces with the positive electrode. When less than 2 ma./cm.$^2$, a charging time of longer than 24 hours is required for sufficient charging and there is a practical difficulty. Of course, in case of floating charge, a charging current density of less than 2 ma./cm.$^2$ at the ratio of load to cell may be applied. In case of high current, a charging current should be cared. When the charging current density exceeds 12 ma./cm.$^2$, both positive and negative electrodes are easily polarized and before the internal short-circuit by growth of dendritic deposit zinc separated from the negative electrode, a friction phenomenon of positive electrode from the inside wall of the positive electrode can occurs owing to generation of oxygen gas. Simultaneously with the generation of oxygen gas, generation of hydrogen gas is caused in the negative electrode to result in inflation and puncture of the cell due to increase of inner pressure of the cell.

Furthermore, when dendritic zinc grows to bring about internal short phenomenon, since the crystals at a high charging current are coarse, such short at a high charging current is apt to be in non-reversible state. In any case, charging at a high current is not preferable because it causes reduction of the cycle life of the rechargeable alkaline manganese cell. The charging current referred to herein is especially important range with reference to the end of charging or overcharging area and the value may exceed said range at the time of initial charging when no gas is generated from both the positive and negative electrodes. For example, in case of the charging method with constant voltage or constant voltage cut-off circuit of 1.7–1.8 v. per unit cell which has been applied, no overcharging is attained and generation of gas within the cell is prevented and therefore, no troubles are caused even with initial charging at a high current of about 20–30 ma./cm.$^2$. When charging is carried out at less than 12 ma./cm.$^2$, the cell can stand continuous overcharging for a long period of time and shows a cycle life of at least several ten cycles and furthermore, internal partial short is caused by overcharging and self-discharge after completion of charging is such that brings about no practical troubles. That is, during overcharging, the internal partial short caused by growth of dendritic deposit zinc substantially prevents electrochemical reactions due to overcharging. Once the charging is stopped, the dendritic deposit zinc which brings about said short phenomenon selectively discharge and dissolved in the electrolyte. Thus, the short state disappears in a relatively short period.

The rechargeable alkaline manganese cell according to this invention can be charged not only by a constant current method of a considerably wide range, but also by the method with the conventional constant voltage or constant voltage cut-off circuit. Thus, the cell of this invention has the characteristic that the charging device may be considerably freely selected.

Another embodiment of the cell according to this invention is shown in FIG. 2. In this FIG. 2, 41 is a positive electrode can, 42 is a positive electrode of a mold mixture of manganese dioxide powders and graphite powders, 43 is another positive electrode in positive electrode current collecting pocket 44 made of perforating sheet which is nickel plate steel. One end of said pocket 44 is electrically connected to the bottom of positive electrode can 41 by spot welding. A zinc negative electrode 45 is surrounded by mat-like separator 46 which has a U-shaped cross section and the negative electrode is provided between the two positive electrodes 42 and 44. The capacity of negative electrode 45 at initial discharge is prepared such that it does not exceed 60% of the total theoretical capacity of positive electrodes 42 and 43 as in the above embodiment. Positive electrodes 42 and 43, negative electrode 45 and separator 46 are impregnated with an electrolyte. 47 is a polyethylene seal, 48 is an inner metal bottom plate through which a hole 49 for gas exhaust is drilled, 50 is a conductor which penetrates the center of seal 47 and which riveted lead tab 51 of negative electrode 45, 52 is an insulating plate, 53 is an upper plate which also serves as a positive electrode terminal plate, 54 is an outer metal bottom plate which also serves as a negative electrode terminal plate and 55 is a spring. These are integrated with a heat shrinkable polyvinyl chloride tube 56. 57 is a ring-like insulating packing and 58 is a cylindrical metal jacket. The upper and lower ends of the jacket are curled toward inside to seal the cell. The rechargeable alkaline manganese cell shown in FIG. 2 has the following characteristics like the cell shown in FIG. 1. That is, (1) the capacity of the zinc negative electrode is limited within a range wherein the manganese dioxide positive electrode can be reversed to non-discharge state by charging after discharging and apparently deep discharge until practically usable voltage may be carried out, (2) the thickness of the zinc negative electrode active material layer is limited, and (3) a mat-like separator of a given thickness is used to make it possible to prevent substantial overcharging even by a common constant current charging method which requires no constant voltage or constant voltage cut-off circuit. In addition to the above, since the cell of FIG. 2 contains two manganese dioxide positive electrodes and the amount of the packed positive electrode becomes greater, the capacity of cell per one charging can be increased. Furthermore, since the facing area of the positive and negative electrodes is large, the discharging voltage is high and the cell is suitable for high rate discharge.

4Ω constant resistance discharge characteristic curves obtained at 5th cycle of the conventional rechargeable alkaline manganese cell (A) referred to before and the rechargeable alkaline manganese cells (B) and (C) of this invention as shown in FIGS. 1 and 2 are comparatively shown in FIG. 4. The y axis in FIG. 4 shows discharge voltage and the x axis shows discharge time.

The manganese dioxide positive electrode used in the embodiment of this invention is produced by incorporating graphite powders as a conductive agent into manganese dioxide powders, but a part of said conductive agent may be replaced by acetylene black, carbonyl nickel powders. Addition of acetylene black enhances the pore volume of the positive electrode to prevent the friction phenomenon of the positive electrode and inside wall of the positive electrode can due to expansion and contraction of volume of the positive electrode by charge and discharge. Addition of carbonyl nickel powders improves the bonding of the particles of the positive electrode to give the similar effects. Furthermore, as a zinc negative electrode, the so-called paste type electrode which is formed by kneading and applying an amalgamated zinc to a copper net has been referred to, but gel-type or mold electrode may be used and no limitation is given to the production thereof.

What is claimed is:

1. A rechargeable alkaline manganese cell which comprises a positive electrode comprising manganese dioxide, a zinc negative electrode limiting a discharge capacity of less than 60% of the theoretical capacity of said positive electrode, a mat-like separator capable of causing partial short phenomenon due to dendritic zinc crystal between said positive and negative electrodes and an alkaline electrolyte, wherein an active material layer of the negative electrode has a thickness of not more than 3 mm. and wherein the thickness of said mat-like separator impregnated with the electrolyte is 0.5–4.0 mm.

2. A cell according to claim 1, wherein the mat-like separator is made of a fiber selected from the group consisting of hydrophilic cotton and polyvinyl alcohol.

3. A cell according to claim 1, wherein the mat-like separator is made of a fiber selected from hydrophilic cotton and polyvinyl alcohol with polyvinyl alcohol as a binder.

References Cited

UNITED STATES PATENTS

| | | | |
|---|---|---|---|
| 3,530,496 | 9/1970 | Amano et al. | 136—30 |
| 2,669,594 | 2/1954 | Andre | 136—6 |
| 3,013,100 | 12/1961 | Mendelsohn et al. | 136—146 |
| 3,342,639 | 9/1967 | Harivel | 136—6 |
| 3,022,367 | 2/1962 | Horowitz et al. | 136—146 |
| 3,288,651 | 11/1966 | Linton | 136—107 |
| 3,332,802 | 7/1967 | Clune et al. | 136—107 X |
| 3,335,031 | 8/1967 | Kordesch | 136—6 |
| 1,548,539 | 8/1925 | Martus et al. | 136—111 |

ANTHONY SKAPARS, Primary Examiner

U.S. Cl. X.R.

136—107